July 10, 1951  O. E. IHLE ET AL  2,559,877
COMBINED CONTAINER AND DISPENSER FOR LIQUIDS
Filed Dec. 6, 1948  2 Sheets-Sheet 1
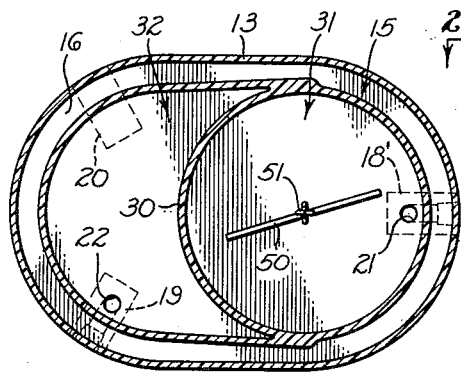
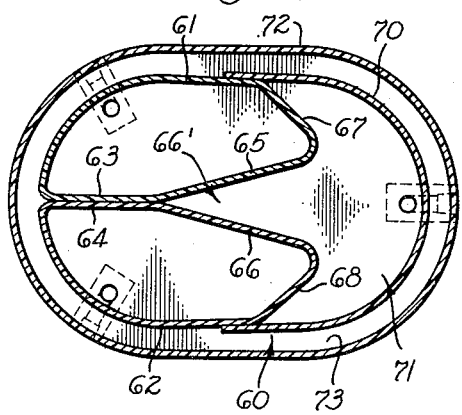
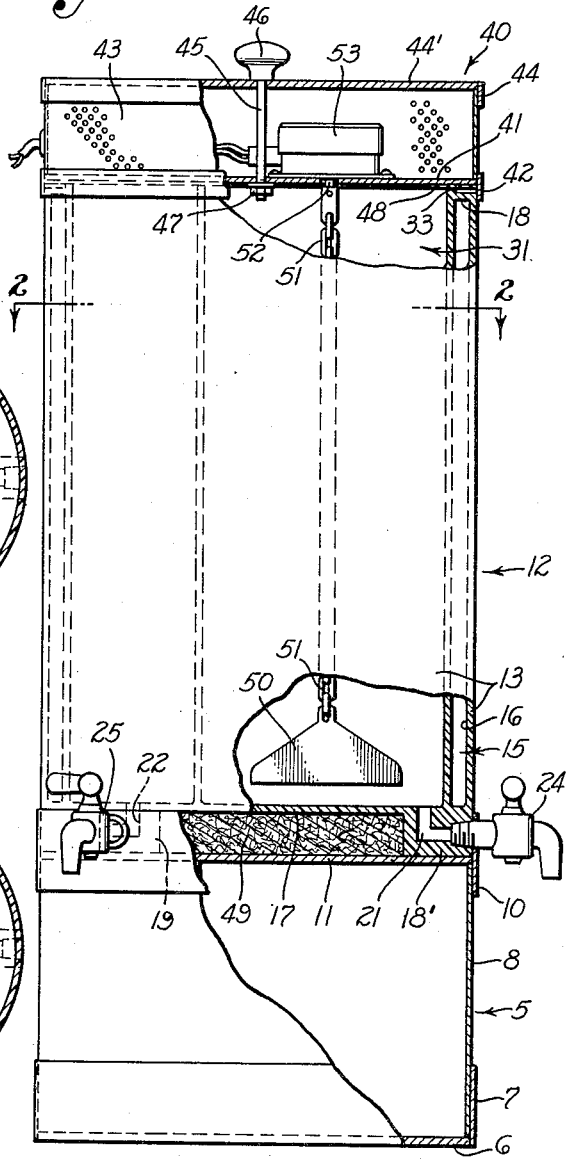
INVENTORS.
ORDEN E. IHLE
EDWIN J. KAPTEYN
BY THEIR ATTORNEYS.
HARRIS, KIECH, FOSTER & HARRIS
By Patented July 10, 1951

2,559,877

UNITED STATES PATENT OFFICE 2,559,877

COMBINED CONTAINER AND DISPENSER FOR LIQUIDS

Orden E. Ihle, Glendale, and Edwin J. Kapteyn, Los Angeles, Calif., assignors to Orden E. Ihle, doing business as Ihle Manufacturing Company, Glendale, Calif.

Application December 6, 1948, Serial No. 63,814

8 Claims. (Cl. 222—131)

This invention relates generally to means for dispensing liquids and more particularly to a device for containing and dispensing cooled soft drinks such as fruit juices.

Various containers or receptacles are employed in eating and drinking establishments for holding a supply of fruit juice or other liquid refreshment and for dispensing the liquid into glasses as required. It is customary to first place crushed ice into a glass before filling the same with the juice, the ice serving to cool the juice. While various means have been proposed for cooling the fruit juice or other beverage prior to its being dispensed, such cooling means have certain disadvantages which detract from their efficiency and usefulness. For example, in some such devices, the liquid is cooled by ice disposed in a compartment arranged below the liquid compartment and through which the liquid passes as it is dispensed, such devices being ineffectual in simultaneously cooling the entire volume of the liquid and consequently inefficient in performing their intended functions. In devices wherein the ice compartment is arranged above the liquid compartment the cooling effect is even more inefficient since the liquid is cooled only when the liquid compartment is relatively full. It has also been proposed to provide a liquid container which is surrounded by a transparent jacket, the ice being inserted into the space between the walls of the container and jacket, but while such an arrangement is quite efficient in cooling the liquid it has one disadvantage in that the ice conceals the liquid content of the juice container and the appearance of the dispenser is greatly impaired.

It is an important object of this invention to provide a liquid container and dispensing device having a container for containing fruit juice or other liquid beverage, the liquid being visible through the wall of the container, and a compartment disposed alongside said liquid container and adapted to contain ice for cooling the liquid. A related object is to provide a dispenser in which the surface area of the wall between the two compartments is relatively large so that adequate cooling of the liquid is effected even though the ice does not contact the entire peripheral wall of the liquid container, and it is a further object to provide an ice compartment, the wall of which is translucent so that the ice is invisible to an observer.

Another object is to provide a liquid dispensing device of the character referred to in which the compartments for liquid and ice are enclosed by a shell or jacket which is spaced therefrom to provide a thermal insulating "dead air" space so as to avoid transfer of heat from the atmosphere to the ice which would, of course, melt the same. Another relative object is to provide a dispensing device in which the jacket has an outer, irregular, light-diffusing surface which produces a "frosty" appearance so that the impression of coldness is conveyed to the observer.

Another object of the invention is to provide a liquid dispensing device in which the main elements are adapted for manufacture from plastic material, and one which has a base member for supporting the receptacle and a cover member for closing the open top of the receptacle, the invention further providing thermal insulating means disposed between the receptacle and the base member and between the receptacle and the cover member so as to reduce the melting of the ice to a minimum.

Another object is to provide a liquid dispenser which embodies agitator means for continuously agitating the fruit juice or other liquid to maintain the consistency of the dispensed juice substantially uniform. A related object is to provide agitator means which consists of a light weight plate-like blade carried by a chain which, in turn, is connected to and suspended from the drive shaft of a small electric motor disposed within the cover member.

Further objects of the invention will appear from the following description of the device and from the drawing, which is for the purpose of illustration only, and in which:

Fig. 1 is a side elevational view of a liquid dispensing device constructed in accordance with the present invention, certain portions of the device being broken away to reveal the internal structure;

Fig. 2 is a cross-sectional view, taken on line 2—2 of Fig. 1; and

Fig. 3 is a view similar to Fig. 2 but showing an alternative construction.

Figure 5:
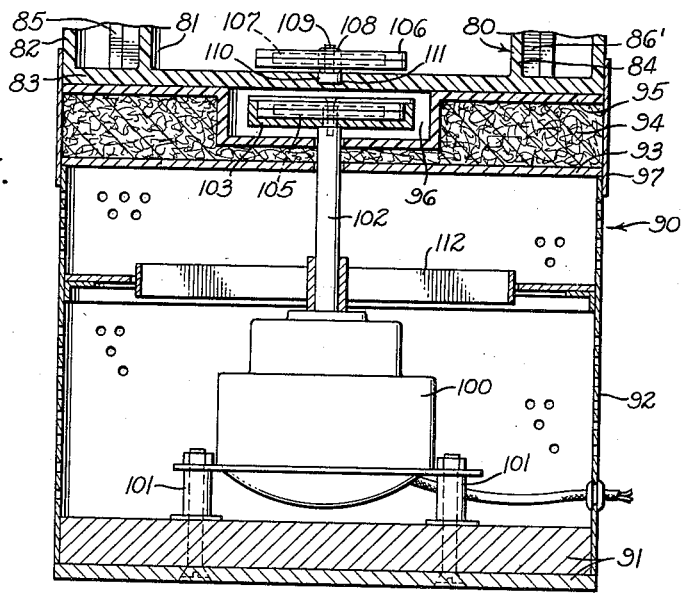
Fig. 5 is a vertical sectional view, taken on line 5—5 of Fig. 4.

Referring to the drawing in detail, the present improved liquid storing and dispensing device includes a base member 5. The base member 5 has a plate element 6 which may be made from pressed wood fibers or other material and adapted to rest upon a counter or shelf, the element being substantially elliptical in plan view. A closed band 7, preferably although not necessarily made from stainless steel, surrounds the periphery of the plate element 6, the element being forced thereinto and retained in place by a suitable adhesive. The plate element 6 and band 7 together provide a cup-shaped assembly for receiving the lower end of a tubular element 8, also of substantially elliptical cross-sectional shape, the element being secured in place by any suitable means. Secured to and surrounding the upper end of the tubular element 8 is a second stainless steel band 10. A support plate 11, constructed from pressed wood fibers or the like, rests upon the upper end of the tubular element 8 and serves to support the ice and liquid receptacle 12 to be next described.

The receptacle 12 is composed of several parts which are made from any suitable transparent plastic material, such as methyl methacrylate and secured together by a suitable adhesive. The receptacle 12 includes an outer tubular shell member or jacket 13 which is of substantially elliptical cross section and of a size to adapt it to be received within the upper projecting end of the band 10. The outer surface of the jacket 13 is sand-blasted or otherwise treated to produce a pebbeled effect which effects a "frosted" appearance.

Disposed within the shell member 13 is a tubular receptacle member 15 of the same cross section as the shell member. The member 15 is spaced inwardly from the side of the shell member 13 so that a vertical space 16 is provided between these members. The shell member 13 and receptacle member 15 are joined at their lower ends by a substantially elliptical bottom plate 17 and at their top portion by a substantially elliptical strip 18. It is thus seen that the members 13 and 15 are held in spaced relation and that the intervening space 16 is entirely closed. The "dead air" space 16 provides a thermal insulation area surrounding the receptacle member 15 for reducing the rate of heat transfer from the atmosphere to the receptacle member for the purpose to be later explained. The assembled receptacle 12, composed of the plastic shell member 13, the receptacle member 15, the plate 17 and strip 18, is adapted to be supported by the base member 5, as shown in Fig. 1, a plurality of plastic blocks 18', 19 and 20 being joined to the bottom of the plate 17 and serving as feet which rest upon the support plate 11 within the confines of the band 10. The blocks 18' and 19 are provided with angular passages or discharge ports 21 and 22 respectively, these ports communicating with the interior of the receptacle member 15. Faucets or petcocks 24 and 25 have threaded stems passing through holes in the band 10 and screwed into the outer threaded ends of the respective ports 21 and 22, these faucets being employed for controlling the flow of liquid from the receptacle member 15 for the purpose to be later explained.

The receptacle member 15 is provided with a septum or partition 30 which divides the interior of the member into two compartments or containers 31 and 32. As shown in Fig. 2, the partition 30 is substantially semicircular in cross section so that the container 31, which is hereinafter referred to as the juice container, is made cylindrical. The other container 32, which serves to hold a quantity of ice or ice water, is substantially crescent shape in plan view. The temperature of the fruit juice or other beverage in the container 31 is effectively cooled through the partition 30 which serves as a heat transferer and which is maintained cool by the ice or ice water within the container 32. As a particular feature of the present invention, the partition 30 has a relatively large surface area so that a very effective cooling of the liquid in the container 31 is produced. Stated another way the partition 30 has a considerably larger surface area than if it were made straight and extended transversely of the receptacle member 15. By this provision, substantially one half the total surface of the wall of the juice container 31 is in contact with the ice or ice water in the container 32 so that an adequate cooling action is effected. Preferably the upper end of the circular wall which defines the juice compartment 31 projects above the strip 18 to provide a bead 33 which serves as a baffle to prevent moisture which might condense on the strip from flowing down into the juice compartment.

While the receptacle member 15 has been described as a substantially elliptical part which is divided into the two compartments or containers 31 and 32 by the curved partition 30, in actual practice it has been found advantageous, for purposes of manufacture, to make the receptacle member from two components as shown in Fig. 2. That is to say, the receptacle member can be conveniently produced by utilizing an extruded, cylindrical, plastic tube for the liquid container, and a U-shaped plastic element, the vertical edges of which are suitably joined to the periphery of the tube. By this construction, standard plastic tubing can be employed and a portion of the wall thereof, in the present instance substantially one half of the entire wall, provides the partition for dividing the receptacle member into the two compartments or containers 31 and 32. The U-shaped plastic element is preferably sand-blasted on its outer or inner surface so as to produce a translucent effect which tends to further obscure the particles of ice disposed in the container 32. It is thus seen that while the fruit juice in the container 31 is visible to the observer, the cooling medium is quite invisible and the appearance of the dispenser as a whole is enhanced. It is also to be noted that the desirable appearance of the dispensing device is obtained by the use of plastic materials adapted for economical manufacture and convenient assembly so that the cost of producing the article is maintained at a low figure.

It will be apparent that the plastic shell member 13 can be made as an extrusion or produced from a sheet of plastic, in which case the vertical edges of the sheet are suitably joined in a butt or overlapping joint in any suitable manner. It is also obvious that the plastic sheets from which the member 13 and the U-shaped element might be produced can be preformed with any suitable ornamentation, such as the sand-blast effect mentioned previously, during the rolling or molding of the sheets.

The liquid dispensing device also includes a closure member or cover 40 for closing the upper end of the receptacle member 15. The cover 40 may comprise a substantially elliptical lower plate 41 made from pressed wood fibers or the like, and a stainless steel band 42 which surrounds the edge of the plate, the plate being forced into the band and retained therein by a suitable adhesive or by any other means. Nested within the upper projecting end of the band 42 and resting upon the plate 41 is a perforated tube 43 which carries a stainless steel band 44 at its upper end. The cover 40 also has a second plate 44', similar to the plate 41, which rests upon the upper end of the tube 43 within the band 44.

The several components of the cover 40 described above may be held in assembled relationship by means of a bolt 45 passing through aligned holes in the plates 44' and 41. The bolt 45 has a knob-like head 46 which abuts the plate 44' and a nut 47 screwed onto the lower threaded end of the bolt and set up against the plate 41, draws the several parts together. A sheet 48 of cork or other material having a low coefficient of heat conductivity is preferably cemented to the bottom surface of the plate 41, the sheet being adapted to seal the upper end of the receptacle member 15 when the cover 40 is in place thereon. It is also to be noted that the bottom of the receptacle member 15 is insulated from the atmosphere by a mat of plastic foam, glass wool or other suitable material 49 disposed between the bottom of the receptacle member and the support plate 11.

To fill the container 31 with fruit juice or other soft drinks, it is necessary to merely remove the cover 40, by means of the knob 46, after which the liquid refreshment can be poured into the container and the cover again placed on the receptacle member. In a like manner, a supply of crushed ice can be conveniently placed in the compartment 32.

To dispense the fruit juice from the container 31, a glass is held beneath the spout of the faucet 24 and the faucet opened to permit flow of the liquid through the port 21. It is also desirable to drain water from the ice compartment 32 and this is accomplished by opening the petcock 25 to allow flow of the water through the port 22.

When certain liquids such as orange juice are to be dispensed, it is highly desirable that the liquid be continuously agitated so as to prevent settling of the fruit pulp in the bottom of the container 31. In the present device, such agitation is produced by a plastic stirrer or agitator element 50 which is carried at the lower end of a plastic chain 51. The upper end of the chain 51 is attached to the shaft 52 of a small electric motor 53 which is disposed within the cover 40 and secured to the lower plate 41 thereof. Circulation of air around the motor 53 for cooling purposes is permitted through the perforations of the tube 43. During operation of the motor 53, the chain 51 and its connected agitator element 50 are rotated at a relatively slow rate of speed and the element 50 functions to stir or agitate the liquid content of the container 31. When the cover 40 is removed to permit filling of the device, the agitator means is simultaneously withdrawn from the device.

It is within the concept of this invention to provide a liquid dispensing device in which the receptacle member is constructed in accordance with the modification shown in Fig. 3. In this alternative construction, the receptacle member 60 is composed of two plastic containers 61 and 62 which have abutting side walls 63 and 64 cemented or otherwise secured together. The containers 61 and 62 also have adjacent but diverging walls 65 and 66, a V-shaped opening 66' thus being provided between the containers. The containers 61 and 62 also have slanted rear walls 67 and 68. A U-shaped plastic element 70 has its vertical edges secured to the outer sides of the containers 61 and 62 and defines with the walls 65, 67 and 66, 68 an ice compartment 71. It is to be noted that the walls 65, 67 and 66, 68 provide heat transfer partitions between the liquid containers and the ice compartment, and that these partitions provide relatively great surface areas so that adequate cooling of the two liquids in the containers 61 and 62 is effected. In other respects, the dispenser illustrated in Fig. 3 is identical in construction to that shown in Figs. 1 and 2, a shell member or jacket 72 surrounding the receptacle member 60 to provide a "dead air" insulating space 73 therebetween.

Figure 4:
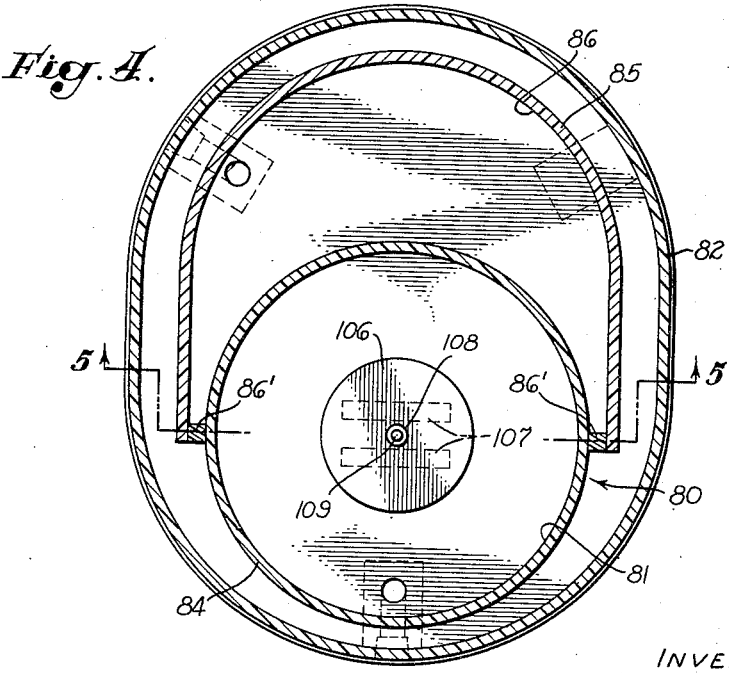
Fig. 4 is a horizontal sectional view of the lower portion of a liquid dispensing device of modified construction.

Referring now to Figs. 4 and 5, the present invention also contemplates the use of an agitator means of alternative construction. In this embodiment of the invention the receptacle member 80 defines a juice compartment 81 and is enclosed by a shell 82, the member and shell having a common bottom wall 83. As shown in Fig. 4, the receptacle member 80 includes a tubular element 84, which defines the juice compartment 81, and a U-shaped element 85 which defines with said tubular element an ice compartment 86 of substantially crescent-shaped outline. The end portions of the sides of the U-shaped element 85 are, as in the embodiment illustrated in Figs. 1 to 3, joined to the periphery of the tubular element 84 but in the modified form spacer elements 86' are interposed between these end portions and the periphery of the element 84 so as to avoid sharp angular crevices in which foreign matter might lodge.

The receptacle member 80 is supported by a base member 90 which consists of a two-part bottom plate 91, to the periphery of which is secured a perforated metal tube 92. A plate of fiberboard 93 rests upon the upper end of the tube 92 and supports a layer 94 of insulating material, such as foam plastic material. Resting upon the layer 94 is a plastic top plate 95 having walls defining a well 96. A metal band 97 surrounds the upper end of the base 90 and above the top thereof to enclose the lower end of the receptacle which is supported by the plate 95.

An electric motor 100 is supported by mounting means 101 from the bottom plate 91 and has an upwardly projecting shaft 102 which extends into the well 96. The upper reduced end of the motor shaft 102 carries a plastic disc 103 in which is held a pair of permanent magnet bars 105. Disposed above the rotatable disc 103, within the juice compartment 81, is a similar disc 106 which also has a pair of permanent magnet bars 107. The disc 106 has an axial bushing 108 which is rotatable on a vertical stud or pin 109. The pin 109 has a head 110 seated in a recess 111 in the upper surface of the bottom plate 83 at the center of the juice compartment 81. Adjacent the motor 100, the shaft 102 carries a fan 112 for circulating air through the base 90 for the purpose of maintaining the motor cool.

During operation of the motor 100, the shaft 102 and disc 103 carried thereby are rotated at a relatively high rate of speed. Due to the magnetic fields set up between the permanent magnets 105 and 107 of the respective discs 103 and 106, the disc 106 is caused to rotate at the same speed as the disc 103. The frictional engagement of the disc 106 with the juice within the compartment 81 causes a swirling agitation of the juice so that the fruit pulp of the juice is held in suspension and prevented from settling to the bottom of the juice compartment.

While we have herein shown and described the liquid dispensing device as embodied in several preferred forms of construction, by way of example, it is obvious that other modifications might be made therein without departing from the spirit of the invention. Consequently, we do not wish to be limited in this respect, but desire to be afforded the full scope of the appended claims.

We claim as our invention:

1. A liquid dispensing device, comprising: an outer shell member; a receptacle member disposed within said outer shell member with its sides in spaced relation thereto to provide a thermal insulating space therebetween, said receptacle having an open top and a closed bottom; vertical transverse partition means within said receptacle member extending between opposite walls thereof and dividing the interior thereof into at least two containers, at least one of said containers being adapted to contain a liquid to be dispensed and having a discharge port therein, and at least one of said containers being adapted to contain a cooling agent for cooling said liquid, said partition means having relatively high thermal conductivity so as to cause said cooling agent to effect cooling of said liquid, said partition means being non-planar and having a surface area greater than the cross-sectional area of said receptacle member; manually operable means for controlling discharge of the liquid through said port; and cover means for closing the top of said receptacle.

2. A liquid dispensing device as defined in claim 1 and including: a base member for supporting said outer shell member and said receptacle member; upper and lower wall means extending between said shell member and said receptacle member and closing the ends of said insulating space; and a cover member restable upon said upper wall means for closing the top of said receptacle member, said cover member having a peripheral band surrounding the upper end of said shell member.

3. A liquid dispensing device as defined in claim 1 in which said receptacle member is provided with feet, said port extending through one of said feet, and including: a base member supporting said outer shell member and said receptacle member with said feet resting upon said base member; a removable cover member closing the open top of said receptacle member; and thermal insulating means disposed between said receptacle member and said base member, and between said receptacle member and said cover member.

4. A liquid dispensing device as defined in claim 1 and including: a hollow base member supporting said outer shell and said receptacle member, a hollow removable cover member closing the top of said receptacle member; thermal insulating means disposed between said receptacle member and said base member and between said receptacle member and said cover member; an electric motor mounted within and supported by said cover member; and a rotatable agitator means within said container for liquid, said agitator means being rotated by said motor.

5. A liquid dispensing device, comprising: an outer shell member of substantially elliptical cross section; a receptacle member of substantially elliptical cross section disposed within said shell member with its sides in spaced relation thereto to provide a thermal insulating space therebetween, said receptacle having a closed bottom and open top; a semi-circular partition extending transversely and vertically between opposite walls thereof within said receptacle member and dividing the interior thereof into a substantially cylindrical container adapted to contain a supply of liquid to be dispensed, and a container of substantially crescent-shaped cross-section adapted to contain a cooling agent for cooling said liquid, said partition having relatively high thermal conductivity so as to cause said cooling agent to effect cooling of said liquid, the walls of said containers having discharge ports therein through which the liquid can be dispensed and the cooling agent can be withdrawn; and valve means for controlling the flow of liquid and cooling agent through said ports.

6. A liquid dispensing device, comprising: an outer shell member of substantially elliptical cross section; a receptacle member of substantially elliptical cross section disposed within said shell member with its sides in spaced relation thereto to provide a thermal insulating space therebetween, said receptacle having a closed bottom and open top; a vertical partition within said receptacle member dividing the interior thereof into a pair of containers each adapted to contain a supply of liquid to be dispensed, and a third container adapted to contain a cooling agent, the portions of said partition between each container for liquid and said container for cooling agent having a surface area greater than one-half the cross-sectional area of said receptacle member, said partition having relatively high thermal conductivity so as to cause said cooling agent to effect cooling of said liquid, the walls of said containers having discharge ports therein through which the liquid can be dispensed and the cooling agent withdrawn; and valve means for controlling the flow of liquid and cooling agent through said ports.

7. A liquid dispensing device as defined in claim 1 and including: an agitator disc rotatable within said container for liquid; rotary power means disposed outside said container; and cooperable magnetic means on said disc and said power means by which said disc is rotated by said power means.

8. A liquid dispensing device as defined in claim 1 and including: an agitator disc rotatable within said container for liquid and provided with at least one permanent magnet bar extending transversely of the axis of rotation of said disc; a driving disc coaxial with said agitator disc and rotatable outside said container, said driving disc having at least one permanent magnet bar extending transversely of its axis of rotation; and power means for rotating said driving disc, magnetic fields set up between said magnet bars of said discs causing said agitator disc to be rotated by said driving disc.

ORDEN E. IHLE.
EDWIN J. KAPTEYN.

REFERENCES CITED

The following references are of record in the file of this patent:

UNITED STATES PATENTS

| Number | Name | Date |
|---|---|---|
| 21,819 | Clark | Oct. 19, 1858 |
| 227,919 | Peck | May 25, 1880 |
| 441,628 | Coon et al. | Nov. 25, 1890 |
| 637,815 | Muslar | Nov. 28, 1899 |
| 1,013,263 | Zysett | Jan. 2, 1912 |
| 1,600,866 | Burnett | Sept. 21, 1926 |
| 1,634,374 | McDonald et al. | July 5, 1927 |
| 1,892,196 | Thompson | Dec. 27, 1932 |
| 1,910,514 | Ashenden | May 23, 1933 |
| 2,167,448 | Feld | July 25, 1939 |
| 2,355,731 | James | Aug. 15, 1944 |